Sept. 10, 1963  J. C. KREJCI  3,103,418
PRODUCTION OF CARBON BLACK
Filed April 14, 1960

INVENTOR.
J. C. KREJCI
BY *Hudson + Young*
ATTORNEYS

United States Patent Office 3,103,418
Patented Sept. 10, 1963

3,103,418
PRODUCTION OF CARBON BLACK
Joseph C. Krejci, Phillips, Tex., assignor to Phillips Petroleum Company, a corporation of Delaware
Filed Apr. 14, 1960, Ser. No. 22,350
6 Claims. (Cl. 23—209.4)

This invention relates to the production of carbon black. In one specific aspect it relates to the production of carbon black in a furnace by pyrochemical action in which the properties of the carbon black are improved by the presence of chlorine compounds in the hydrocarbon feed. In another aspect it relates to the production of increased yields of carbon black by comparison to yields normally produced in such a furnace.

It is known in the prior art to produce carbon black by directing a hot oxidizing or combustion gas in a generally helical path adjacent the periphery of a generally cylindrical reaction zone and directing a reactant material axially into said zone inside the helically-moving mass of hot gas. The reactant is thereby rapidly heated to a carbon black-forming temperature, e.g., in the range 2200 to 3500° F., and reacted in said zone to form carbon black, which is subsequently recovered. Another tangential flame type process involves the injection of a combustible mixture of fuel and oxidizing gas circumferentially into a combustion zone and the reaction of the mixture by combustion near the periphery of said zone. The resulting combustion gas, at a high temperature, travels in a generally spiral path toward the axis of a combustion zone and is then directed in a generally helical path adjacent the periphery of the reaction zone which is contiguous with, of smaller diameter than, and in open communication with, said combustion zone. A carbonaceous reactant is directed along the common axis of said zones and is rapidly heated to a carbon black-forming temperature by virtue of heat directly imparted from the helically-moving combustion gas. The reactant is converted within the reaction zone to form carbon black, which is subsequently recovered. This type of tangential-flame process is known as a precombustion process, since the hot gas is substantially completely formed by combustion prior to contact with the reactant.

The reaction mixture formed in the process of the type above described comprises a suspension of the carbon black in combustion gas. It is known in the prior art to withdraw such a mixture from the reaction zone and to cool the mixture suddenly by the direct injection thereinto of a cooling liquid, such as water, in order to cool the mixture suddenly to a temperature at which no further reaction can occur. The carbon black is then separated therefrom by any usual means old in the art, such as running the effluent through bags to screen out the carbon black.

I have found that by the prior mixing of a chlorine compound with the hydrocarbon axial feed to said combustion and reaction zones, increased yields of carbon black are obtained. The chlorine compound employed can be any chlorine compound that will liberate chlorine, preferably chlorinated hydrocarbons. I have further found that when the carbon black so produced is compounded according to conventional rubber tread stock recipes, a rubber is produced having superior qualities in modulus, resilience, and abrasion resistance.

One object of this invention is to provide an improved process for producing carbon black.

Another object of this invention is to provide a process for producing an improved carbon black capable of imparting high abrasion resistance to rubber compounds in which said carbon black is added.

Another object of this invention is to provide a process whereby the yield of carbon black is substantially increased.

Other objects, advantages, and features of my invention will be readily apparent to those skilled in the art from the following description and appendant claims.

Figure 2:
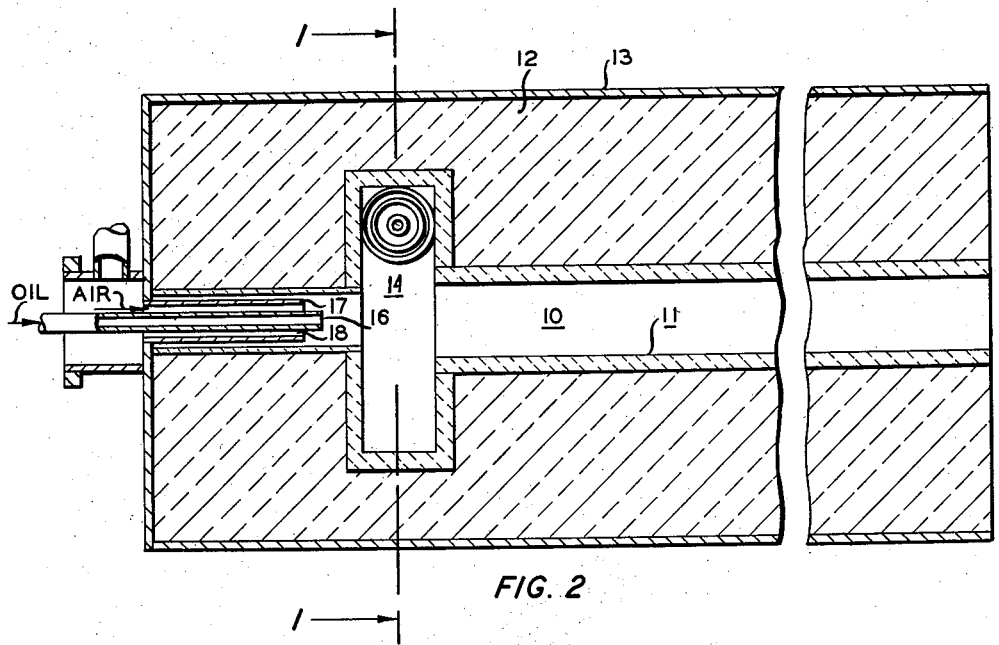
FIGURE 2 is a longitudinal sectional view of the same furnace taken on line 2—2 of FIGURE 1.

The process of this invention is directed to producing a substantially tar-free carbon black having a photelometer value of at least 86. The tar content of carbon black is determined by mixing 2 grams of black with 50 cc. of chloroform, boiling the mixture, filtering, and determining the percentage light transmittance of a blank sample of chloroform. The comparison is preferably conducted with a photoelectric colorimeter such as a Lumetron colorimeter at a wavelength of 440 mu, a light intensity of 20, and cell one centimeter long. A tar-free black is arbitrarily defined as one that shows in tests on samples taken after pelleting a transmittance greater than 85 percent according to this procedure. Pelleting the flocculant black by a conventional process raises the photelometer number five points, or more, from 80 to 85, for example.

Chlorinated hydrocarbon compounds, such as carbon tetrachloride, chloroform, and ethylene dichloride can be employed in practicing the process of this invention. The chlorine compound is added to the hydrocarbon feed so as to have a concentration of said chlorine in said feed in the range of 1 to 10 percent by weight, preferably 2 to 5 percent.

Referring now to the drawing which illustrates one form of apparatus in which the process of my invention may be practiced, a cylindrical reaction chamber 10 has a lining 11 of highly refractory material. Between this refractory liner 11 and a cylindrical steel shell 13 is a layer of insulation 12. At the upstream end of this chamber is a short cylindrical section 14 of rather large diameter called a "combustion" zone. This section has a refractory lining 11 and an insulation layer 12.

In the upstream or inlet wall of the combustion zone 14 of the furnace is a feed pipe 16 arranged axially so that feed introduced therethrough will pass axially through the furnace. Surrounding this feed pipe 16 is a larger pipe 17, defining an annular space 18 through which it is intended to pass air into the furnace. Air passing through this annular space 18 is intended to keep the inner end of the feed tube cooled to prevent the deposition of carbon thereon.

In the combustion zone 14 inlets 15 are so disposed that gas and air passing therethrough and into the combustion zone will do so in a direction tangent to the cylindrical walls. Each inlet contains a small gas conduit 19 completely surrounded by a larger air conduit 20, with said gas conduit passing through a conduit 21 and terminating in a larger conduit 22 which later terminates as an opening in the refractory liner 11 of the combustion chamber wall. Air conduit 20 terminates within said conduit 21. Through this burner assembly is passed a combustible mixture of fuel gas, such as natural gas, in an oxygen-containing gas, such as air. This combustible mixture is intended to being burning as soon as it leaves conduit 19. Burning gas and flame, and air, and the hot products of combustion then flow circumferentially around the wall of the the combustion zone 14. Upon continued injection of the combustible fuel mixture, the flame and combustion products follow a spiral path until the diameter of the spiral becomes less than the diameter of the reaction zone 10. By this time it is intended that substantially all of he gaseous fuel has been consumed, and the hot combustion products then follow a helical path adjacent a cylindrical wall to the reaction zone.

I will hereinafter describe the production of a superior carbon black using an oil feed having the following characteristics:

A.S.T.M. DISTILLATION

| | |
|---|---|
| First drop °F__ | 459 |
| 5% °F__ | 533 |
| 10% °F__ | 556 |
| 20% °F__ | 589 |
| 30% °F__ | 610 |
| 40% °F__ | 631 |
| 50% °F__ | 651 |
| 60% °F__ | 671 |
| 70% °F__ | 699 |
| 80% °F__ | 738 |
| 90% °F__ | 772 |
| Bureau of Mines correlative index | 92.4 |
| Gravity, API @ 60° F. | 11.0 |
| Carbon residue (Ramsbottom) _weight percent__ | 3.35 |
| Pour point, °F. | 15 |
| Aniline No. | 82.2 |
| Refractive index, 20/D | 1.5806 |

In the inventive process for the production of carbon black with a heavy hydrocarbon oil, describe above, as a source of carbon, the oil is mixed with a chlorine compound such as carbon tetrachloride so that the concentration of chlorine is in the range of 1 to 10 percent by weight, preferably 2 to 5 percent. The feed mixture is preheated to about 765° F. and introduced at this temperature through the tube 16 of FIGURE 2 into the combustion end of the furnace. This tube 16 is a 5/16 inch I.D. tube centered in a 3/8 inch I.D. air jacket tube 17. Air is added to the furnace through the annulus 18 at the rate of about 1400 c.f.h. Air so added may be varied as desired, the important point being to maintain the discharge ends of the tubes 16 and 17 sufficiently cool to prevent deposition of carbon thereon in case some carbon is formed. The air is intended to remove the carbon black combustion.

Figure 1:
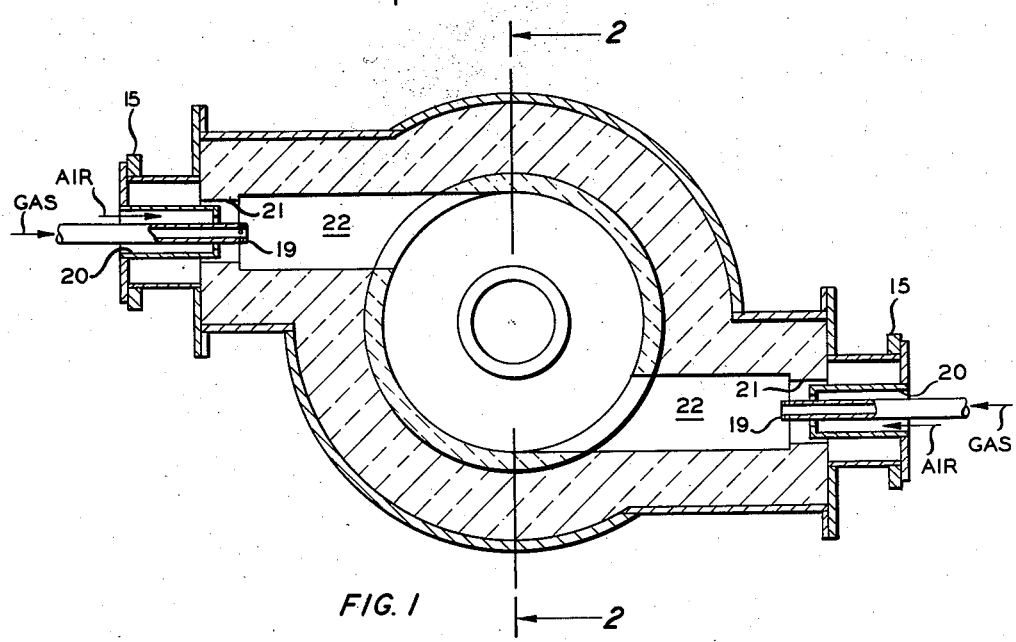
FIGURE 1 is a transverse sectional view of the furnace used in practicing the process of my invention and taken on the line 1—1 of FIGURE 2.

In the examples given hereinafter, the tangential fuel inlet assembly of FIGURE 1 was used. The openings 22 were 4¾ inches in diameter and the tubes 19 extended into the opening 22 as shown. Tubes 19 were of 3/8 inch I.D.

The following is an analysis of the tangentially injected fuel gas:

| | Gas volume, percent |
|---|---|
| He | 0.66 |
| $N_2$ | 9.18 |
| $CH_4$ | 78.94 |
| $C_2H_6$ | 6.27 |
| $C_3H_8$ | 3.51 |
| $C_4H_{10}$ | 0.96 |
| $CO_2$ | 0.48 |

This fuel gas and air were mixed in the proportions of 23,040 c.f.h. of air to 1,560 c.f.h. of gas and the resulting combustible mixture injected through the tangential inlets 15 at a velocity greater than the rate of flame propagation. By this rapid rate of fuel mixture injection the danger of an explosion in the fuel lines was averted.

To illustrate the effectiveness of the inventive process the following runs were made and the results noted in Table I. Conditions of operation not noted in the table were as indicated previously.

The combustion chamber 14 was 15 inches in diameter by 4¾ inches long; the reaction zone 10 was 4 inches in diameter by 5 feet long.

Table I

| Run No. | Chlorine Material Added | Oil Rate, gal./hr. | Carbon Black Yield, lbs./gal. | Photelometer Value | Nitrogen Surface Area sq. m./g. |
|---|---|---|---|---|---|
| 1 | None | 27.9 | 2.98 | 88 | 144.9 |
| 2 | 5 Wt. percent $CCl_4$ | 29.8 | 3.32 | 90 | 143.0 |
| 3 | 5 Wt. percent $C_2H_4Cl_2$ | 27.9 | 3.20 | 92 | 148.4 |

Samples of carbon black from the above mentioned runs 1, 2, and 3 were made up in rubber compounds and vulcanized to finished rubber. The compounding formula used for this evaluation was a conventional butyl tread recipe and was as follows:

| | Parts by weight |
|---|---|
| Butyl 217 [1] | 100 |
| Carbon black | 50 |
| Zinc oxide | 5 |
| Stearic acid | 1 |
| Form 40 [2] | 10 |
| Methyl Tuads [3] | 1.1 |
| Altax [4] | 1.1 |
| Sulfur | 2 |
| Elastopar [5] | 0.6 |

[1] Isobutylene/Isoprene copolymer containing 97.5% isobutylene; 61–70 ML–8 at 212° F.
[2] Plasticizer oil comprised of 66% paraffins, 6% first acidifins, 25% second acidifins, 3% nitrogen bases.
[3] Tetramethylthiuram disulfide.
[4] Benzothiazyl disulfide.
[5] N-methyl-N,4-dinitrosomethylaniline.

These compounds were vulcanized at 307° F. for 30 minutes and after vulcanization possessed properties as given in Table II. However, the values reported in columns headed "Modulus Index," "Resilience Index," and "Abrasion Index" were obtained from samples compounded as above mentioned, vulcanized for 30 minutes, and the vulcanized samples aged for 24 hours at 212° F., prior to the determination of the modulus index, abrasion index, and resilience index.

Table II

| Run No. | Test Samples Vulcanized 30 Minutes | | | Test Samples Vulcanized 30 Minutes, Then Aged 24 Hrs. @ 212° F. | | |
|---|---|---|---|---|---|---|
| | 300% Modulus, p.s.i. | Tensile Strength, p.s.i. | Elongation, Percent | Modulus Index | Resilience Index | Abrasion Index |
| 1 | 1,190 | 2,950 | 585 | 100 | 100 | 100 |
| 2 | 1,280 | 2,885 | 550 | 109 | 108 | 114 |
| 3 | 1,285 | 3,070 | 600 | 106 | 107 | 107 |

In Table II, the term "300% Modulus p.s.i." refers to the pounds per square inch pull in the tension tests when the test piece of vulcanized rubber has been stretched 300 percent of the length of the original test piece. The "Tensile Strength p.s.i." column represents the pounds per square inch pull at the point of rupture or break of the test piece undergoing the above mentioned 300 percent modulus test. The "Elongation" column represents the stretch of elongation at the point of "break." Resilience is a measure of potential energy of a piece of rubber that is present as a result of the applied stress and which is recoverable when the stress is removed. Abrasion is a loss in weight of a test piece of rubber of standard size when exposed to standard abrasion conditions. The rubber compounded and vulcanized containing the chlorine-free carbon black of run 1 was assigned the index number of 100. Index values of runs 1, 2, and 3 thereby provide a basis for comparing and evaluating performance of the various carbon blacks.

In each case where the chlorine compound was added to the oil feed to the carbon black furnace, a rubber significantly superior in abrasion, resilience, and modulus was obtained. Upon comparing runs 1 and 2 of Table I it is noted that the oil rate was seven percent higher and the yield was increased by 11 percent, yet surface area values for the two blacks were essentially the same. The advantages of thus producing a carbon black wherein the oil feed to the carbon black furnace contains chlorine are at once obvious.

An additional run was made to compare the carbon black produced by the inventive process to the carbon black produced by the process described in U.S. 2,587,107. That patent described the production of a carbon black having more tar than usual. The tar was removed from the recovered black by liquid extraction using a chlorinated hydrocarbon solvent. Tars recovered along with a small portion of the chlorinated solvent were then added to the oil feed for recycling.

Run 4 was made under the same operating condition as run 3 except that the oil rate was set 10 percent higher, producing a carbon black having a photelometer value of 14. This carbon black was extracted as noted above, producing a carbon black having a nitrogen surface area of 107.8 sq. m./g. This carbon black was then compounded in a rubber recipe as were runs 1, 2, and 3, vulcanized, and aged under the same conditions. Results are noted in Table III where data obtained in runs 1 and 2 are repeated for convenience of comparison.

*Table III*

| Run No. | Test Samples Vulcanized 30 Minutes | | | Test Samples Vulcanized 30 Minutes, Then Aged 24 Hrs. @ 212° F. | | |
|---|---|---|---|---|---|---|
| | 300% Modulus, p.s.i. | Tensile Strength, p.s.i. | Elongation, Percent | Modulus Index | Resilience Index | Abrasion Index |
| 1 | 1,190 | 2,950 | 585 | 100 | 100 | 100 |
| 2 | 1,280 | 2,885 | 550 | 109 | 108 | 114 |
| 4 | 1,200 | 2,740 | 550 | 96 | 121 | 90 |

It is obvious that the extracted black is not equivalent to the carbon black produced by the inventive process with respect to rubber reinforcement performance, as significantly lower modulus and abrasion indices were obtained.

As will be evident to those skilled in the art, various modifications of this invention can be made, or followed, in the light of the foregoing disclosure and discussion, without departing from the spirit or scope thereof.

I claim:
1. In a continuous furnace carbon black producing process comprising the continuous steps of passing a hydrocarbon feed into a carbon black furnace, heating said hydrocarbon in said furnace to convert a portion of said hydrocarbon to a carbon black by a pyrochemical cracking operation in a first zone in said furnace, cooling the effluent resulting carbon black containing gases, and separating said carbon black and said gases; an improvement which comprises adding a chlorine-liberating compound to said hydrocarbon feed in an amount sufficient to increase the yield of said carbon black and to produce said carbon black in a substantially tar-free state.

2. The process of claim 1 wherein the concentration of chlorine in said hydrocarbon feed is in the range of 1 to 10 percent by weight.

3. The process of claim 1 wherein the concentration of chlorine in said hydrocarbon feed is in the range of 2 to 5 percent by weight.

4. The process of claim 2 wherein the chlorine compound added to the hydrocarbon feed is a chlorinated hydrocarbon.

5. The process of claim 4 wherein said chlorinated hydrocarbon is carbon tetrachloride.

6. The process of claim 4 wherein said chlorinated hydrocarbon is ethylene dichloride.

References Cited in the file of this patent
UNITED STATES PATENTS

| | | |
|---|---|---|
| 1,259,121 | Mott | Mar. 12, 1918 |
| 1,891,859 | Winter | Dec. 20, 1932 |
| 2,587,107 | Cade | Feb. 26, 1952 |
| 2,632,713 | Krejci | Mar. 24, 1953 |
| 2,665,194 | Jordan | Jan. 5, 1954 |